(12) United States Patent
Nishida et al.

(10) Patent No.: US 7,782,011 B2
(45) Date of Patent: *Aug. 24, 2010

(54) BATTERY PACK CHARGING APPARATUS AND METHOD FOR CONSTANT CURRENT AND CONSTANT VOLTAGE CHARGING OF MULTIPLE BATTERY PACKS

(75) Inventors: Junji Nishida, Neyagawa (JP); Shinya Manabe, Takarazuki (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/920,810

(22) Filed: Aug. 18, 2004

(65) Prior Publication Data
US 2005/0046386 A1    Mar. 3, 2005

Related U.S. Application Data

(63) Continuation of application No. 10/360,311, filed on Feb. 7, 2003, now Pat. No. 6,803,745.

(30) Foreign Application Priority Data
Feb. 7, 2002    (JP)    ............................. 2002-030586

(51) Int. Cl.
*H02J 7/00*    (2006.01)
(52) U.S. Cl. .................. 320/112; 320/124; 320/162
(58) Field of Classification Search ................. 320/152, 320/112, 124, 162; 429/61; 324/434
See application file for complete search history.

(56) References Cited

U.S. PATENT DOCUMENTS

| | | | |
|---|---|---|---|
| 5,396,163 A | | 3/1995 | Nor et al. |
| 5,686,808 A | * | 11/1997 | Lutz ............................ 320/110 |
| 5,710,506 A | * | 1/1998 | Broell et al. ................. 320/145 |
| 5,723,971 A | * | 3/1998 | Sakai et al. .................. 320/106 |
| 5,903,131 A | * | 5/1999 | Sekine et al. ................ 320/106 |
| 6,124,700 A | * | 9/2000 | Nagai et al. .................. 320/132 |
| 6,236,194 B1 | | 5/2001 | Manabe et al. |
| 6,504,344 B1 | * | 1/2003 | Adams et al. ................ 320/132 |
| 6,803,745 B2 | * | 10/2004 | Nishida et al. ............... 320/112 |
| 7,282,891 B2 | * | 10/2007 | Smallwood et al. ......... 320/137 |

FOREIGN PATENT DOCUMENTS

JP    56110446    9/1981

(Continued)

*Primary Examiner*—Edward Tso
*Assistant Examiner*—Aaron Piggush
(74) *Attorney, Agent, or Firm*—Cooper & Dunham LLP

(57) ABSTRACT

A charging apparatus for charging a plurality of detachable battery packs includes a charging device for charging the plurality of battery packs one after another. A monitoring device is included to monitor attachment of a battery pack. A memory is included to store attachment history data of a battery pack based upon a monitoring result. A switching device is included to switch from one of the battery packs to the next battery pack. A voltage detecting device is included to detect a voltage of the next battery pack before charging. A charging manner setting device is included to set any one of constant current charging and constant voltage charging in accordance with the detected voltage. A charge current detecting device is also included to detect a current during charging of the next battery pack.

20 Claims, 4 Drawing Sheets

FOREIGN PATENT DOCUMENTS

| | | |
|---|---|---|
| JP | 56166731 | 12/1981 |
| JP | 2-87937 | 3/1990 |
| JP | 424759 | 2/1992 |
| JP | 7130399 | 5/1995 |
| JP | 7-153498 | 6/1995 |
| JP | 2001-45673 | 2/2001 |
| JP | 2002-10508 | 1/2002 |

* cited by examiner

BATTERY PACK CHARGING APPARATUS AND METHOD FOR CONSTANT CURRENT AND CONSTANT VOLTAGE CHARGING OF MULTIPLE BATTERY PACKS

This is a continuation, and claims the benefit of priority, of application Ser. No. 10/360,311filed Feb. 7, 2003 now U.S. Pat. No. 6,803,745.

BACKGROUND

1. Field

This patent specification relates to a charging method capable of charging a plurality of secondary battery packs (herein after refereed to as a battery pack) such as lithium ion batteries. In particular, it relates to an optimal charging apparatus and method for charging spare (backup) battery packs used in an instrument body and mobile instrument, such as a mobile phone, a digital camera, etc.

2. Discussion of the Background

Due to smallness of a power supply capacity of a charging apparatus, a method of attaching and charging a plurality of battery packs one after another in the charging apparatus has been practiced, and many patent applications thereabout has been filed. Even though the term "a battery" is utilized in the below described literature, plural batteries serially arranged are generally used as a battery pack, because the voltage per cell of this type of secondary battery is small.

For example, Japanese Patent Application Laid Open No. 56-110446 discloses a technology for efficiently charging normal batteries by skipping a battery that expresses abnormally lower voltage during charging. Japanese Patent Application Laid Open No. 56-166731 discloses a technology for charging an inert battery in a similar manner to a normal battery by separately and sequentially charging a plurality of batteries one after another, using a charging control mechanism when controlling charging of each battery. Japanese Utility Model Application Publication No. 4-24759 discloses a charging apparatus that charges a plurality of batteries one after another while detecting completion of charging of each battery. Such an apparatus detects attachment, and initializes and proceeds to charge the uncharged batteries when the uncharged battery is attached. Japanese Patent Application Laid Open No. 7-130399 refers to a technology capable of shortening a charging time period by stopping charging when temperature of a battery in the course of being charged exceeds a prescribed level, then charging the next one, and re-starting charging of the former battery when temperature of the next battery exceeds a prescribed level.

According to these former two applications, charging of an additional uncharged battery must be initiated by freshly attaching the uncharged battery after the entire batteries has been charged, because detection of the uncharged battery is impossible if the uncharged battery is newly attached during charging. The charging apparatus of Japanese Utility Model Application Publication No. 4-24759 inconveniently recharges a charged battery which does not require additional charging, because the charging apparatus returns to an initial condition and starts charging again restarting from the first battery when an uncharged battery is attached, even though the uncharged battery is charged. Although a time period for charging the entire batteries is advantageously shortened, the technology of Japanese Patent Application Laid Open No. 7-130399 takes a long time period in completing charging of the first battery in comparison with a case when charging one by one. Further, since an uncharged battery is not detected, charging can be started only by freshly attaching the uncharged battery after charging of the entire batteries has been completed, similar to the technology of Japanese Patent Application Laid Open No. 56-166731 or the like. Further, a conventional charging apparatus itself typically is bulky and costly, because a control circuit for charge control use in the conventional apparatus is entirely built therein.

SUMMARY

Accordingly, an object of the present specification is to address and resolve the above-noted and other problems and provide a new battery pack charging apparatus. The above and other objects are achieved according to the present specification by providing a novel battery pack charging apparatus that charges in turn a plurality of battery packs which are attached to the apparatus. The novel battery pack charging apparatus, according to one embodiment, includes a switching device operative to switch the plurality of battery packs and select a battery pack to be charged, a charging circuit configured to charge the selected battery pack, a charging manner setting circuit operative to set any one of constant current charging and constant voltage charging to be executed by the charging circuit during charging, a battery pack voltage detecting circuit configured to detect a voltage of the selected battery pack, a charge current detecting circuit configured to detect a current during charging, a battery pack attachment detecting circuit configured to detect an attachment condition of a battery pack, and a memory configured to store detachment and attachment history data of a battery pack based on an attachment condition detected by the battery pack attachment detecting circuit. A battery pack to be charged next and charging manner therefore may be determined in accordance with the detachment and attachment history data in the memory and the voltage detected by the battery pack voltage detecting circuit, after current charging to a battery pack is completed.

In another embodiment, a preparatory charging process is continued for the battery pack until the detected voltage of the battery pack increases to a first voltage level after the detected voltage is lower than the first voltage level. A constant current charging process is performed until the detected voltage of the battery pack grows up to a second voltage level when the detected voltage is higher than the first voltage level, and a constant voltage charging process is performed until charge current flowing through a battery pack becomes less than a prescribed current after the voltage of the battery pack has reached the second voltage level.

In yet another embodiment, when another battery pack has been attached to the charging apparatus before current charging to the battery pack is completed, the other battery pack is selected by the switching device, and detachment and attachment history data related to the other battery pack is read from the memory. When the other battery pack is additionally attached, charging thereto is performed by starting from a determination process for determining whether the detected voltage of the other battery pack is higher or lower than the first voltage level.

In yet another embodiment, when the other battery pack has been already attached before current charging to the battery pack has been completed and the detected voltage is lower than a third voltage level, constant current charging is performed thereto.

In yet another embodiment when the other battery pack has already been attached and the voltage is higher than the third voltage level, charging is omitted and it is detected if still another battery pack has been attached.

In yet another embodiment, an attachment condition is always monitored by the battery pack attachment detecting circuit after current charging to the battery pack has been completed, and when another battery pack has not been attached, the voltage of the battery pack to which charging is completed is detected, and when the detected voltage is lower than the third voltage level, charging to the battery pack is started from the constant current charging process.

In yet another embodiment, at least one battery pack among the plural battery packs is built in a prescribed instrument body, and other battery packs are for backup use.

In yet another embodiment, the battery pack built in the prescribed instrument body is charged in preference to the other battery packs.

In yet another embodiment, the charging manner setting circuit is included in the prescribed instrument body.

BRIEF DESCRIPTION OF THE DRAWINGS

A more complete appreciation of the invention claimed in the appended claims and many of the attendant advantages thereof may be more readily understood from the following detailed description when considered in connection with the accompanying drawings, wherein:

DESCRIPTION OF PREFERRED EMBODIMENTS

This application claims priority under 35 USC §119 to Japanese Patent Application No. 2002-030586 filed on Feb. 7, 2002, the entire contents of which are incorporated by reference herein.

Figure 1:
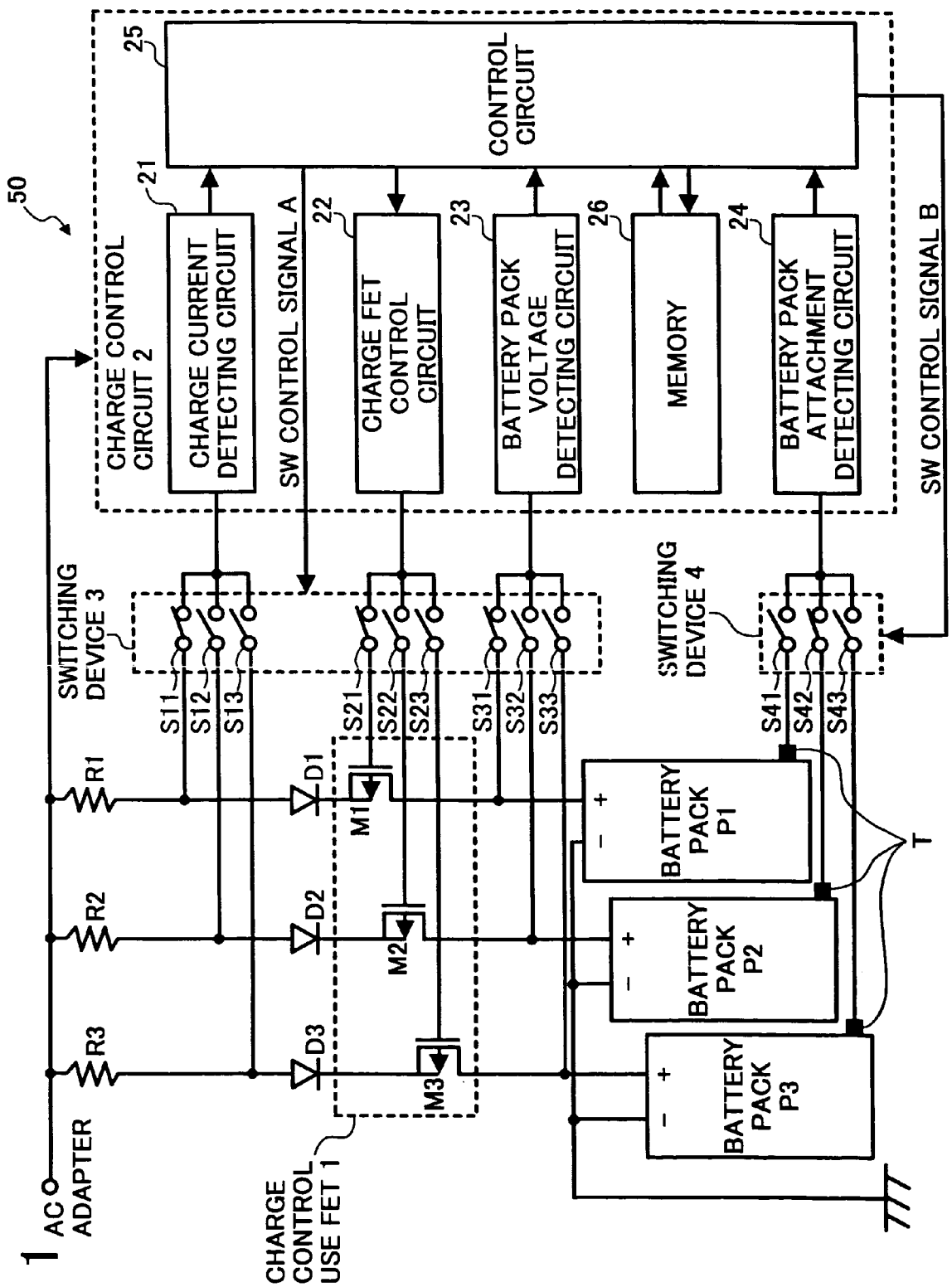
FIG. 1 is a circuit diagram illustrating one example of a charging apparatus according to the present invention.
Figure 2:
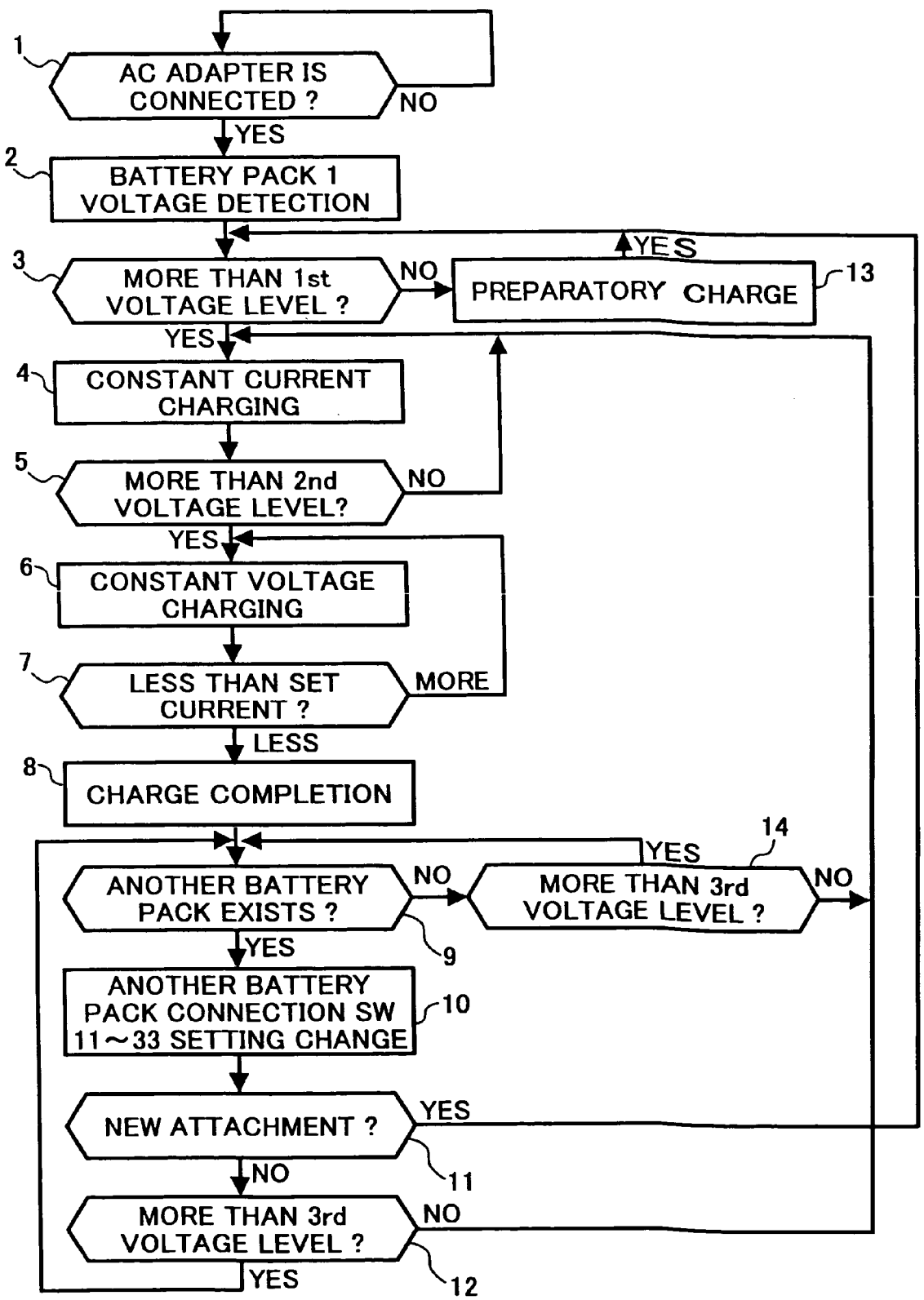
FIG. 2 is a flowchart illustrating an operation of the charging apparatus of FIG. 1.
Figure 3:
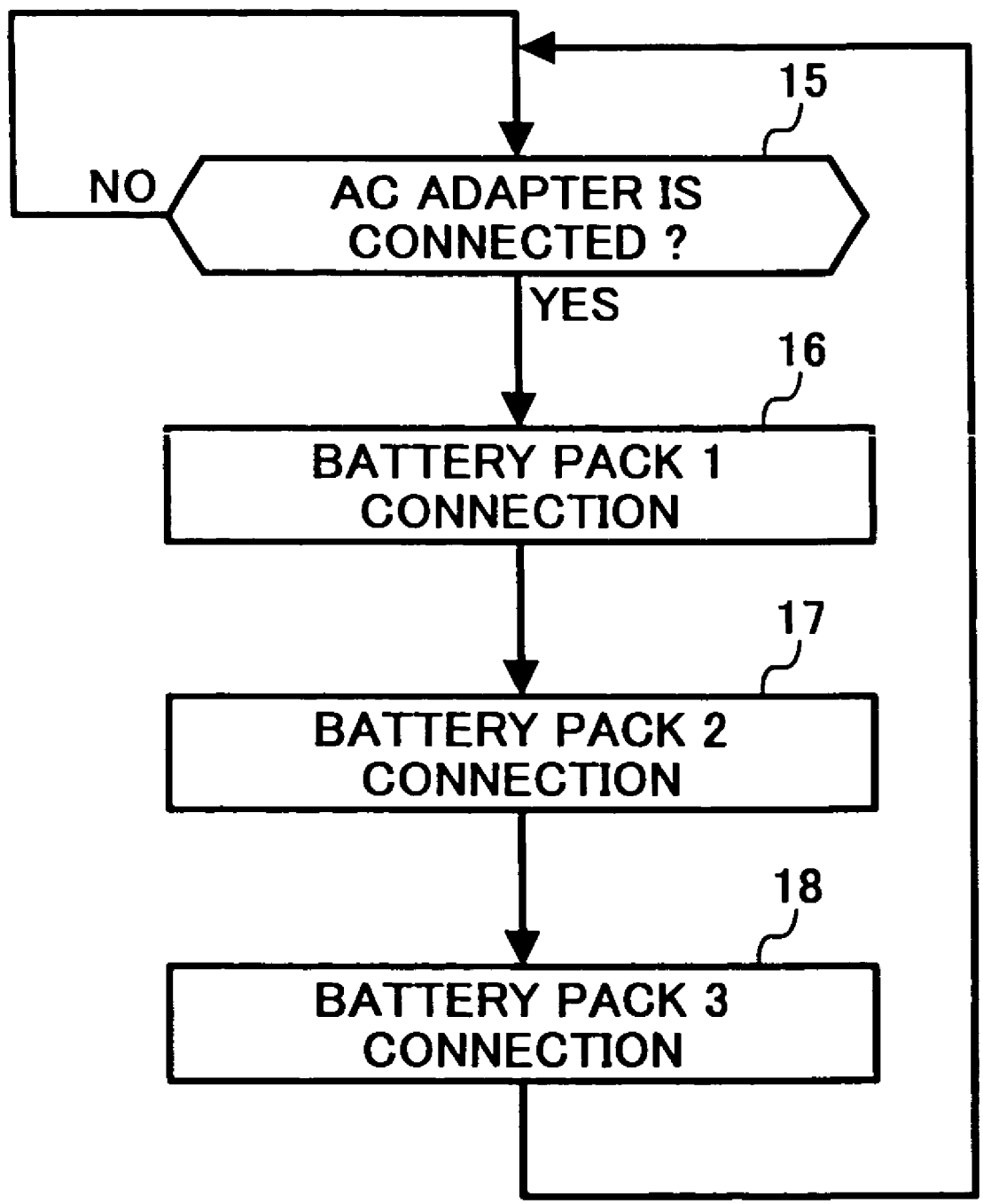
FIG. 3 is a flowchart illustrating a sub routine for detecting an attachment condition of a battery pack.

Referring now to the drawings, wherein like reference numerals and marks designate identical or corresponding parts throughout several views, in particular in FIG. 1, an example of the present invention is illustrated. FIGS. 2 and 3 are flowcharts illustrating charging methods according to the present invention. A charging apparatus 50 of FIG. 1 illustrates an example using three battery packs P1 to P3. It should be understood by one skilled in the art after reading this specification and the appended claims, however, that the apparatuses and methodologies of this specification may be adapted for use with two or more battery packs.

The charging apparatus 50 includes a charge control use FET section 1 that performs switching control, a charge control circuit 2 that controls charging, and switching devices 3 and 4. The charging apparatus 50 itself is supplied with power source from an AC adapter.

Each of sources M1 to M3 of respective FETs (field effect transistors) of switching control use FET1 is connected to a positive potential of the AC adapter via a corresponding one of backflow prevention use diodes D1 to D3 and a corresponding one of resisters R1 to R3. Further, each of the drains of the FETs is connected to a corresponding one of the plus terminals of the battery packs. Each of the gates of the FETs is connected to a charge FET control circuit 22 included in the charge control circuit 2 via a corresponding one of the switching devices 3 (S21 to S23). Minus terminals of the battery packs are mutually connected to each other at one side and connected to ground at the other side.

The charge control circuit 2 includes a charge current detecting circuit 21 which detects a current during charging, a charge FET control circuit 22 which controls the switching control use FET1 so as to selectively perform constant current charging, constant voltage charging, and preparative charging, and a battery pack voltage detecting circuit 23 which detects a voltage of a battery pack attached. Also included are a battery pack attachment detecting circuit 24 which detects a battery pack attached to the charging apparatus 50, a control circuit 25 which controls the above mentioned circuits of the charge control circuit 2 and switching devices 3 and 4, and a memory device 26 which stores history data of battery pack attachment based upon a result of monitoring of attachment of a battery pack. The monitoring may always be performed by the battery pack attachment detecting circuit 24 while respective connections performed by the switching device 4 are periodically switched during charging to an arbitrary battery pack attached to the charging apparatus 50.

These switching devices 3 and 4 are formed from mechanical or semiconductor switches. Each of switches (S11 to S13) of the switching device 3 is connected at one end thereof to a corresponding one of connection points between resisters (R1 to R3) and back flow prevention diodes (D1 to D3). The other ends of the switches S11-S13 are mutually connected to each other and further connected to the charge current detecting circuit 21. One end of each of the switches (S21 to S23) is connected to a gate of a corresponding one of the FETs (M1 to M3) of the charge control use FET1, and the other ends of the switches S21-S23 are mutually connected to each other and further connected to the charge FET controlling circuit 22 as mentioned above. One end of each of the switches (S31 to S33) is connected to a plus terminal of a corresponding one of the battery packs, and the other ends of the switches S31-S33 are mutually connected to each other and further connected to the battery pack voltage detecting circuit 23.

The switches (S41 to S43) are connected on one end to terminals T which output prescribed signals when battery packs are attached to the charging apparatus, and the other ends of the switches S41-S43 are mutually connected to each other and further connected to the battery pack attachment detecting circuit 24. The switches S11, S21 and S31 included in the switching device 3 are simultaneously turned ON and OFF. Similarly, the switches S12, S22 and S32 are simultaneously turned ON and OFF, and the switches S13, S23 and S33 are simultaneously turned ON and OFF. Further, the switches S41 to S43 included in the switching device 4 are independently operated from the switching device 3.

The control circuit 25 outputs a SW control signal "A" for controlling the switching device 3 and a SW control signal "B" for controlling the switching device 4. The SW control signal "A" switches charge-receiving battery packs. Specifically, it switches the switching devices 3 from the currently charging battery pack to the next battery pack when charging of the current battery pack has been completed. The SW control signal "B" checks a battery pack attached to the charging apparatus, and turns the switches S41 to S43 ON one after another regardless of either a currently charging or charge standby condition. A time period required for turning ON the switches S41 to S43 in turn is set to, for example several dozen ms, sufficiently shorter than the amount of time generally taken when a battery pack is detached from and attached to the charging apparatus 50.

A charging manner performed by the present charging apparatus 50 is now described with reference to the flowcharts of FIGS. 2 and 3. The charging apparatus 50 starts charging in response to reception of electric power supply from the AC adapter. Initially, a battery pack P1 which is to receive charging is selected by the switching devices 4 and its voltage is detected (in step S2). The battery pack P1 is built in a body of anyone of various instruments which can use the battery pack and charging is started therefrom.

When the voltage of the battery pack P1 is less than a prescribed first voltage level (NO in step S3), preparatory charging is performed (in step S13). Such preparatory charging is performed with current less than that used in constant current charging performed thereafter. A voltage therefore is set to about 2.5V per cell in a case of using a Lithium battery. During preparatory charging, the charging current is restricted to avoid a danger which is generally caused when a secondary battery is in an over discharge condition and is suddenly charged with super power. Thus, a charging current for the preparatory charging is generally from around a few mA to around several dozen mA.

When the voltage of the battery pack P1 is either elevated by the preparatory charging up to the first voltage level, or is larger than the first voltage level from the beginning, a constant current charging is executed (YES in step S4). The constant current charging is performed with a relatively large current set, in accordance with a capacity of the battery pack, so that the charging can be rapid. When the constant current charging has progressed and the battery pack voltage reaches the second voltage level (in step S5), it is switched to constant voltage charging (in step S6).

Since the lithium battery segregates metal lithium out, and accordingly is dangerous when a charging voltage is high, the constant current charging is generally switched to the constant voltage charging when such charging has progressed up to a certain level, so as not to increase the charging voltage. A voltage of the lithium battery at which the constant voltage charging is performed is set to around 4.2 volt per cell. A charge current is monitored during the constant voltage charging (in step S7), and the constant voltage charging is completed when the charge current becomes less than a prescribed current (in step S8).

It is checked, by analyzing the information in the memory 26, whether another battery pack is connected, after charging to the battery pack P1 is completed (in step S9). If another battery pack (P2) is connected (YES in step S9), the switching device 3 switches to the other battery pack P2 (in step S10). Further, it is determined by analyzing the information of the memory 26 whether the battery pack P2 is newly attached (in step S11). If it is newly attached (YES in step S11), the process returns to step S3, and it is determined if a voltage thereof is either higher or lower than the first voltage level.

If the battery pack P2 is not newly attached (i.e., already having been charged up to a voltage level 3) [NO in step S11], the voltage thereof is checked (in step S12). If the voltage is more than the third voltage level (YES in step S12), charging to the battery pack P2 is omitted, and the process returns to step S9, so that still another battery pack attached can be searched for. If it is less than the third voltage level (NO in step S12), the process returns to step S4 and constant current charging is performed to the battery pack P2. The third voltage level gives a reference for determining if the battery pack decreases in voltage, and accordingly, charging is necessary again due to natural discharge. Thus, the third voltage is set to a voltage higher than the second voltage level.

After the charging is completed (in step S8) and another battery pack attached does not exist any more (NO in step S9), the voltage of the charge completed battery pack is detected (in step S14). If the voltage is greater than the third voltage level (YES in step S14), the process returns to step S9. Then, this loop is repeated until another battery pack is attached. If it is less than the third voltage level (NO in step S14) the process returns to step S4, and constant current charging is performed to the formerly charged battery pack (i.e., P1 in this case) (in step S4).

An operation of the switching device 4 is illustrated in FIG. 3. When the AC adapter is connected and electric power supply is input to the charge controlling circuit (YES in step S14), in order to obtain information of battery packs attached to the charging apparatus 50, the switching device 4 (S41 to S43) for battery packs P1, P2 and P3 is repeatedly switched in this order (in step S16 to S18). A cycle of repetition is set sufficiently shorter than a time period during when a battery pack is detached and attached, such as on a scale of a few dozen "Ms" as mentioned above.

Figure 4:
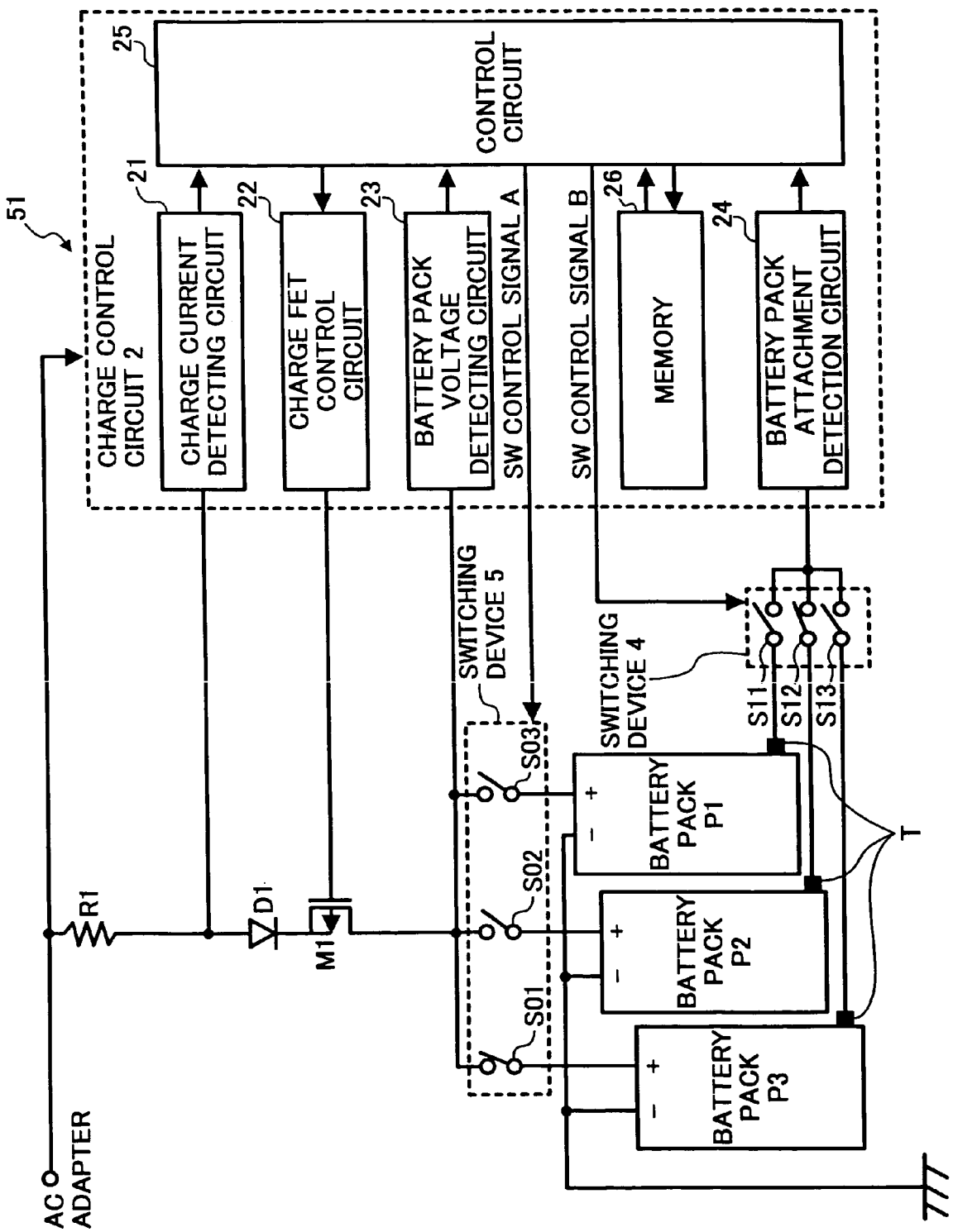
FIG. 4 is a circuit diagram illustrating another embodiment of the charging apparatus according to the present specification.

FIG. 4 illustrates another embodiment. In charging apparatus 51, a resistance, back flow prevention diode, and charge control use FET, which is provided per battery pack as illustrated in FIG. 1, is commonly used by the battery packs. Specifically, a drain of the FET (M1) is connected to any one of battery packs via the switching device 5 (S01 to S03). This circuit configuration can decrease a number of parts in comparison with that of FIG. 1. Since an operation of the circuit and a charging manner of the charging apparatus 51 are substantially the same to those formerly described apparatus, these descriptions are omitted.

In another embodiment, at least one battery pack among the plural battery packs can be built in a prescribed instrument body, and other battery packs are for backup use. Further, a battery pack built in the prescribed instrument body can be charged in preference to the other battery packs.

In another embodiment, the charging manner setting circuit can be included in the prescribed instrument body.

The mechanisms and processes set forth in the present invention may be implemented using one or more conventional general purpose microprocessors and/or signal processors programmed according to the teachings of the present specification, as will be appreciated by those skilled in the relevant arts. Appropriate software coding can readily be prepared by skilled programmers based on the teachings of the present disclosure, as will also be apparent to those skilled in the relevant arts. However, as will be readily apparent to those skilled in the art, the apparatuses and methodologies of the present specification also may be implemented by the preparation of application-specific integrated circuits by interconnecting an appropriate network of conventional component circuits or by a combination thereof with one or more conventional general purpose microprocessors and/or signal processors programmed accordingly. The present invention thus also includes a computer-based product which may be hosted on a storage medium and include, but is not limited to, any type of disk including floppy disks, optical disks, CD-ROMs, magnet-optical disks, ROMs, RAMs, EPROMs, EEPROMs, flash memory, magnetic or optical cards, or any type of media suitable for storing electronic instructions.

In addition, it should be noted that the term "memory" is used in a broad manner to encompass RAMs, as well as any storage device to which data can be written, in which the data can be stored, and from which the data can be read.

Numerous additional modifications and variations of the present invention are possible in light of the above teachings. It is therefore to be understood that within the scope of the appended claims, the apparatuses and methodologies of the present specification may be practiced otherwise than as specifically described herein. For example, elements and/or features of different illustrative embodiments may be combined with each other and/or substituted for each other within the scope of the present disclosure and appended claims.

What is claimed is:

1. A charging apparatus for charging a plurality of detachable battery packs one after another, said charging apparatus comprising:
    a charging device configured to charge the plurality of battery packs one after another;
    a switching device operative to switch from a first one of the battery packs to a next one of the battery packs;
    a voltage detecting device configured to detect a voltage of the next battery pack before charging of the next battery commences;
    a charging manner setting device configured to
        (i) select constant current charging as a charging technique to start charging said next battery pack, if a voltage of the next battery pack detected before charging of said next battery pack commences is in a first range, and
        (ii) select constant voltage charging as a charging technique to start charging said next battery pack, if a voltage of the next battery pack detected before charging of said next battery pack commences is in a second range;
    and
    a charge current detecting device configured to detect a current during charging of the next battery pack,
    wherein the charging device is configured to start charging the next battery pack by using the charging technique selected by said charging manner setting device.

2. The charging apparatus according to claim 1, wherein
    a preparatory charging process is performed to the next battery pack until the detected voltage grows up to a first voltage level, when a secondary battery is used and is in an over discharge condition,
    wherein a constant current charging process is performed until the detected voltage grows up to a second voltage level when the detected voltage is higher than the first voltage level, said second voltage level suppressing segregation of metal in the battery, and
    wherein a constant voltage charging process is performed until charge current flowing through the battery pack becomes less than a prescribed level after the voltage of the battery pack has reached the second voltage level.

3. The charging apparatus according to claim 2, wherein the voltage of said battery pack having completed to receive charging is detected if the another battery pack has not been attached, and charging to the battery pack is started from said constant current charging process if the detected voltage is lower than a third voltage level, said third voltage level representing necessity of charging again due to natural discharge.

4. The charging apparatus of claim 1, wherein when said voltage of the next battery pack detected by said voltage detecting device is below a first threshold voltage level, said charging device performs preparatory charging with a preparatory charging current that is less than a current of said constant current charging.

5. The charging apparatus of claim 4, wherein said preparatory charging is terminated after said voltage of the next battery pack is at or above said first threshold voltage level, and then said constant current charging is performed.

6. The charging apparatus of claim 5, wherein said constant current charging is terminated after said voltage of the next battery pack is at or above a second threshold voltage level which is higher than said first threshold voltage level, and then constant voltage charging is performed.

7. The charging apparatus of claim 6, wherein no charging of the next battery pack is performed if said voltage of the next battery pack is at or above a third threshold voltage level which is higher than said second threshold voltage level.

8. The charging apparatus of claim 7, wherein if said voltage of the next battery pack is at or above said third threshold voltage level and no charging of the next battery pack is performed, availability of another one of the plurality of battery packs for charging is determined.

9. The charging apparatus according to claim 1, wherein
    when the voltage of the next battery pack detected by the voltage detecting device before the charging of said next battery pack is commenced is above a first voltage level and below a second voltage level, constant current charging process is performed, and
    when the voltage of the next battery pack detected by the voltage detecting device before the charging of said next battery pack is commenced is above the second voltage level a constant voltage charging process is performed.

10. The charging apparatus according to claim 9, wherein said next battery pack is a lithium battery, and said second voltage level is a voltage level at and above which segregation of metal in the battery is suppressed.

11. The charging apparatus according to claim 1, wherein
    when the voltage of the next battery pack detected by the voltage detecting device before the charging of said next battery pack is commenced is below a first voltage level, a preparatory charging process is performed,
    when the voltage of the next battery pack detected by the voltage detecting device before the charging of said next battery pack is commenced is above the first voltage level and below a second voltage level, constant current charging process is performed, and
    when the voltage of the next battery pack detected by the voltage detecting device before the charging of said next battery pack is commenced is above the second voltage level a constant voltage charging process is performed.

12. The charging apparatus according to claim 1, wherein said selection of the charging technique to start charging the next battery pack is made by said charging manner setting device before the start of charging of said next battery pack.

13. The charging apparatus according to claim 1, wherein the charging device will start charging the next battery pack using constant voltage charging and will not start charging the next battery pack using constant current charging, if the charging manner setting selects constant voltage charging as a charging technique to start charging said next battery pack.

14. The charging apparatus according to claim 1, wherein said first range is the range of values from said first threshold voltage level to below said second threshold voltage level, and
    wherein said second range is the range of values at or above said second threshold voltage level.

15. A method for charging a plurality of detachable battery packs, said method comprising:
    (a) switching from one of the battery packs to a next one of the battery packs,
    wherein the battery packs are simultaneously physically connected to a charging device, by use of a battery switching means;
    (b) detecting a voltage of the next battery pack before charging of the next battery pack commences;
    (c) selecting, on the one hand, constant current charging as a charging technique to start charging the next battery pack, if the voltage of the next battery pack detected in (b) before charging of said next battery pack commences is in a first range, and selecting, on the other hand constant voltage charging as a charging technique to start charging said next battery pack, if the voltage of the next battery pack detected in (b) before charging of said next battery pack commences is in a second range;

(d) starting charging of the next battery pack by applying the charging technique selected in (c); and (e) detecting a current during charging of the next battery pack.

16. The method of claim 15, further comprising:
comparing said voltage of the next battery pack to a first threshold voltage level; and when said voltage of the next battery pack is below a first threshold voltage level, performing said preparatory charging with a preparatory charging current that is less than a current of said constant current charging.

17. The method of claim 16, further comprising:
comparing said voltage of the next battery pack to said first threshold voltage level, during said preparatory charging;
terminating said preparatory charging after said voltage of the next battery pack is at or above said first threshold voltage level; and
performing said constant current charging after said preparatory charging is terminated.

18. The method of claim 17, further comprising:
comparing said voltage of the next battery pack to a second threshold voltage level which is higher than said first threshold voltage level, during said constant current charging;
terminating said constant current charging after said voltage of the next battery pack is at or above said second threshold voltage level; and
performing said constant voltage charging after said constant current charging is terminated.

19. The method of claim 18, wherein no charging of the next battery pack is performed if said voltage of the next battery pack is at or above a third threshold voltage level which is higher than said second threshold voltage level.

20. The method of claim 19, further comprising determining availability of another one of the plurality of battery packs for charging, if said voltage of the next battery pack is at or above said third threshold voltage level and no charging of the next battery pack is performed.

* * * * *